United States Patent Office 3,598,764
Patented Aug. 10, 1971

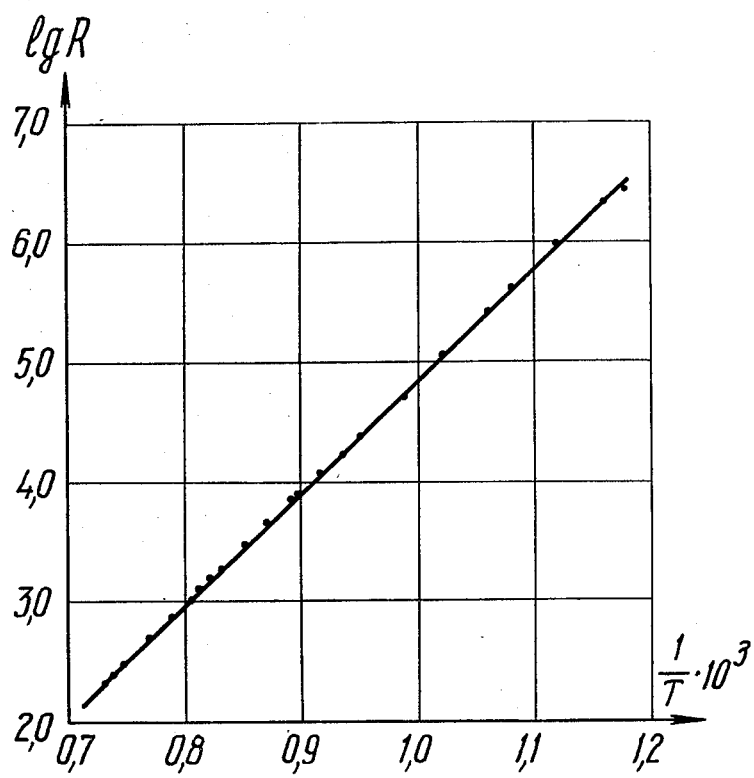

3,598,764
MATERIAL FOR THE MANUFACTURE OF HIGH-TEMPERATURE THERMISTORS
Nikolai Trofimovich Plaschinsky, Ulitsa Pribytkovskaya, and Iosif Teodorovich Sheftel, prospekt Morisa Toreza, 28, kv. 105, both of Leningrad, U.S.S.R.
Filed Dec. 9, 1968, Ser. No. 782,229
Int. Cl. H01b 1/06
U.S. Cl. 252—520                                       3 Claims

ABSTRACT OF THE DISCLOSURE

A material for the manufacture of high-temperature thermistors operating at temperatures of up to 1,000° C., comprising cerium dioxide as the basic component and zirconium dioxide as the additive, said method making it possible to produce thermistors having high and stable electric parameters.

---

This invention relates to thermistors and, more particularly, to materials for the manufacture of high-temperature thermistors.

There is a known material for the manufacture of high-temperature thermistors which comprises a solid solution of high-ohmic metal oxides.

The known material for the manufacture of thermistors consists of zirconium dioxide as the principal component to which is added yttrium oxide in the amount of 2 to 25% by weight, or the same amount of any rare-earth metal oxide in place of the yttrium oxide. This material is intended for the fabrication of thermistors to be used in the working temperature range of from 400° to 1,000° C. The thermistors made from the aforesaid material exhibit at temperatures of 600° and 1,000°, temperature resistance coefficients of −1.58% and 0.74% per degree centigrade, respectively.

Hence, the thermistors made from the known material display inferior and time-dependent electrical characteristics, as evidenced by the fact that at 1,000° the temperature resistance coefficient is as low as −0.74%/° C.

It is an object of the present invention to provide a material for the manufacture of thermistors noted for their superior and steady electrical characteristics.

With these and other objects in view, there is provided a material for the manufacture of high-temperature thermistors which comprises a solid solution derived from high-ohmic metal oxides, wherein, according to the present invention, the solid solution contains cerium dioxide and zirconium dioxide as the high-ohmic metal oxides.

The preferred composition of the material, according to the present invention is as follows: cerium dioxide, 85–98% by weight, and zirconium dioxide, 2–15% by weight.

The aforesaid composition of the material makes it possible to obtain high-temperature thermistors noted for their superior and stable electrical characteristics.

The present invention is illustrated below by the description of an exemplary embodiment thereof with reference to the accompanying drawing which shows the dependence of resistance of a stabilized thermistor made from the present material upon temperature.

The present material comprises a solid solution derived from high-ohmic metal oxides, wherein use is made of cerium dioxide and zirconium dioxide as the high-ohmic metal oxides.

To manufacture high-temperature thermistors, the principal component consists of cerium dioxide taken in the amount of 85–98% by weight and to it there is added zirconium dioxide in the amount, of 2–15% by weight.

On being roasted, the mixtures of oxides having the aforespecified composition yields a solid solution of zirconium dioxide in cerium dioxide which is noted for its stable fluorite-type crystalline structure.

The zirconium dioxide-in-cerium dioxide solid solution is stable over a wide temperature range of up to 1,000° C. and exhibits superior electrical characteristics, viz., a high value of the constant B in the expression for temperature dependence on the volume resistivity of the material, $\delta = Ae^{B/T}$. For the present solid solution, B=21,000–22,000° K.

The manufacturing process for producing the present material and preparing high-temperature thermistors therefrom is as follows.

The starting mixture of cerium and zirconium oxides taken in the appropriate proportions is thoroughly mixed in the presence of water in an agate drum and thereafter preroasted at a temperature of 1,300–1,350° C. for a period of 2–3 hours. The thus roasted material is then subjected to wet grinding in an agate drum for 20–24 hours.

It is expedient to use the material prepared as described above for manufacturing high-temperature thermistors in the form of beads having platinum leads.

To do so, the material should be stirred with a 2% aqueous solution of polyvinyl alcohol until a thick creamy mass is obtained. Next, onto two parallel, taut platinum wires is applied the aforesaid mass in the form of beads which are air dried and then roasted at a temperature of 1,400–1,450° C. in the air for a period of 2–3 hours.

Upon being roasted, the beads with the leads welded therein are mounted in two-channel ceramic tubes, use being made of refractory glaze to secure the platinum wire ends in the ceramic tubes, and subjected to thermal stabilization at 1,000° C. for a period of several hundred hours.

The thus stabilized thermistors are suitable for service in the 600–1,000° C. range.

Shown in the accompanying drawing is the effect of temperature on the resistance of a stabilized thermistor manufactured from the present material, the graph being plotted in coordinates $$\lg R \text{ vs. } \frac{1}{T} \cdot 10^3$$

The resistance of thermistors manufactured from the material consisting of 90% by weight of cerium dioxide and 10% by weight of zirconium dioxide at 650° C. equals $4.7 \times 10^5$ and $6.8 \times 10^5$ ohm±20%. While at a temperature of 1,000° C. the resistance is $6.8 \times 10^2$ and $1 \times 10^3$ ohm±20%. The manufacturing process disclosed hereinabove yields 95% of thermistors having the aforesaid electrical characteristics.

At 600° and 1,000° C., the temperature resistance coefficient of the thermistors, according to the present invention, equals −2.9 and −1.4%/° C., respectively, as found from the relation $-B/T^2$, wherein T is the temperature in ° K.

The electrical characteristics of thermistors may be varied by varying the composition of the material from which the thermistors are fabricated.

The relevant electrical characteristics of the thermistors made from the present material are essentially time-independent. The temperature resistance coefficient of the present thermistors is approximately twice as great as that of the currently available thermistor types.

Although the present invention has been described with reference to a preferred embodiment thereof, it will be readily appreciated by those skilled in the art that various alterations and modifications may be resorted to without deviating from the spirit and scope of the invention as disclosed in the description and appended claims.

We claim:

1. A material for the manufacture of high-temperature thermistors which comprises a solid solution having a stable fluorite-type crystalline structure and consisting of a major amount by weight of cerium dioxide and a minor amount by weight of zirconium dioxide.

2. A material according to claim 1, which contains 85–98% by weight of cerium dioxide and 2–15% by weight of zirconium dioxide.

3. A material according to claim 2 which contains 90% by weight of cerium dioxide and 10% by weight of zirconium oxide.

References Cited

UNITED STATES PATENTS

| | | | |
|---|---|---|---|
| 3,301,646 | 1/1967 | Smoot | 106—57 |
| 3,287,143 | 11/1966 | Yavorsky | 106—57 |
| 3,475,352 | 10/1969 | Anthony et al. | 106—57 |

FOREIGN PATENTS

| | | | |
|---|---|---|---|
| 874,882 | 8/1961 | Great Britain | 252—520 |

DOUGLAS J. DRUMMOND, Primary Examiner

U.S. Cl. X.R.

252—521; 106—57